United States Patent
Kang et al.

(10) Patent No.: US 12,485,798 B2
(45) Date of Patent: Dec. 2, 2025

(54) STATE OF CHARGE CONTROL SYSTEM FOR VEHICLE BATTERY MODULES

(71) Applicant: GM GLOBAL TECHNOLOGY OPERATIONS LLC, Detroit, MI (US)

(72) Inventors: Jun-mo Kang, Ann Arbor, MI (US); Garrett Michael Seeman, Clawson, MI (US); Patrick E. Frost, Berkley, MI (US); Mohamed Kamel, Birmingham, MI (US); Suresh Gopalakrishnan, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 74 days.

(21) Appl. No.: 18/630,386

(22) Filed: Apr. 9, 2024

(65) Prior Publication Data
US 2025/0313128 A1    Oct. 9, 2025

(51) Int. Cl.
| | | |
|---|---|---|
| *B60L 58/00* | (2019.01) | |
| *B60L 58/22* | (2019.01) | |
| *G01R 31/388* | (2019.01) | |
| *G01R 31/396* | (2019.01) | |

(52) U.S. Cl.
CPC ............ *B60L 58/22* (2019.02); *G01R 31/388* (2019.01); *G01R 31/396* (2019.01); *B60L 2240/547* (2013.01); *B60L 2240/549* (2013.01)

(58) Field of Classification Search
USPC .......................................................... 701/22
See application file for complete search history.

(56) References Cited

U.S. PATENT DOCUMENTS

| | | | |
|---|---|---|---|
| 6,454,033 B1* | 9/2002 | Nathan ................... | B60K 17/10 180/65.265 |
| 2012/0109556 A1* | 5/2012 | Syed ....................... | B60L 58/15 702/63 |
| 2015/0046108 A1* | 2/2015 | Akamine .............. | H01M 10/48 702/63 |
| 2017/0120772 A1* | 5/2017 | Alser .................... | H02J 7/0019 |

(Continued)

FOREIGN PATENT DOCUMENTS

DE    102023206964 A1    2/2024

OTHER PUBLICATIONS

German Office Action from counterpart DE1020241145595, dated Apr. 8, 2025.

*Primary Examiner* — Jonathan L Sample

(57) ABSTRACT

An example vehicle battery control system includes an electric motor, a vehicle battery pack configured to supply power to the electric motor, the vehicle battery pack including multiple battery modules each including multiple rechargeable battery cells, and a vehicle control module configured to measure an output current of the vehicle battery pack, estimate a state of charge of the vehicle battery pack using a coulomb counter, and for each of the multiple battery modules, measure an output voltage of the battery module, determine a state of charge shifting bias value for the battery module, estimate an individual state of charge of the battery module by applying the state of charge shifting bias value to the state of charge of the vehicle battery pack, and control at least one of a charging current and a discharging current according to the individual state of charge of the battery module.

20 Claims, 6 Drawing Sheets

(56) References Cited

U.S. PATENT DOCUMENTS

| | | | |
|---|---|---|---|
| 2017/0225584 A1* | 8/2017 | Jin | B60L 3/0046 |
| 2017/0257052 A1* | 9/2017 | Yamamoto | B60W 20/15 |
| 2019/0047437 A1* | 2/2019 | Lee | H02J 7/0029 |
| 2021/0336462 A1* | 10/2021 | Wang | H02J 7/0048 |
| 2021/0344214 A1* | 11/2021 | Patel | H02J 7/1423 |
| 2022/0242250 A1* | 8/2022 | Bolger | B60L 15/20 |
| 2024/0304878 A1* | 9/2024 | Wampler | H01M 10/488 |
| 2024/0351471 A1* | 10/2024 | Andreasen | B60L 3/0046 |
| 2025/0196717 A1* | 6/2025 | Wang | B60L 58/12 |

* cited by examiner

STATE OF CHARGE CONTROL SYSTEM FOR VEHICLE BATTERY MODULES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to state of charge control systems for vehicle battery modules, including estimation of individual battery module state of charge and battery module state of charge balancing.

Electric vehicles have electric motors which are at least partially powered via vehicle battery cells. The vehicle battery cells may be grouped together as vehicle battery modules within a vehicle battery pack. The vehicle battery pack has a pack-level state of charge, and each battery module has a battery-level state of charge.

SUMMARY

An example vehicle battery control system includes at least one electric motor configured to drive one or more wheels of a vehicle, a vehicle battery pack configured to supply power to the at least one electric motor, the vehicle battery pack including multiple battery modules, each of the multiple battery modules including multiple rechargeable battery cells, and a vehicle control module configured to measure an output current of the vehicle battery pack, estimate a state of charge of the vehicle battery pack based on the output current, using a coulomb counter, and for each of the multiple battery modules, measure an output voltage of the battery module, determine a state of charge shifting bias value for the battery module, based on the output voltage, estimate an individual state of charge of the battery module by applying the state of charge shifting bias value to the state of charge of the vehicle battery pack, and control at least one of a charging current and a discharging current of the battery module according to the individual state of charge of the battery module.

In some examples, each of the multiple battery modules are connected with one another in parallel. In some examples, each of the multiple rechargeable battery cells includes a lithium battery cell. In some examples, the multiple rechargeable battery cells include at least one of a cylindrical cell, a pouch cell and a prismatic cell.

In some examples, the vehicle control module is configured to measure an output voltage of the vehicle battery pack, determine a feedback adjustment value according to the output voltage of the vehicle battery pack, and modify the state of charge of the vehicle battery pack according to the feedback adjustment value.

In some examples, the vehicle control module is configured to, for each of the multiple battery modules, determine a lowest state of charge value for the multiple rechargeable battery cells of the battery module, and send the lowest state of charge value of each battery module to a corresponding battery module state of charge estimator.

In some examples, each of the multiple battery modules is configured to passively balance state of charge values of its corresponding multiple rechargeable battery cells by supplying current to a resistor from at least one of the multiple rechargeable battery cells having a highest state of charge value.

In some examples, the vehicle control module is configured to, for each of the multiple battery modules, identify one or more of the multiple rechargeable battery cells having a state of charge greater than the lowest state of charge value of the battery module, and supply current to a resistor from each of the identified one or more of the multiple rechargeable battery cells having a state of charge greater than the lowest state of charge value of the battery module.

In some examples, the vehicle control module is configured to supply an equal amount of output current from each of the multiple battery modules, in response to each of the multiple battery modules having a same individual state of charge. In some examples, each of the multiple battery modules is configured to supply output current via a unidirectional direct current converter.

An example method for controlling battery modules of a vehicle battery pack includes measuring an output current of the vehicle battery pack, the vehicle battery pack configured to supply power to at least one electric motor of a vehicle, the vehicle battery pack including multiple battery modules, each of the multiple battery modules including multiple rechargeable battery cells, estimating a state of charge of the vehicle battery pack based on the output current, using a coulomb counter, and for each of the multiple battery modules, measuring an output voltage of the battery module, determining a state of charge shifting bias value for the battery module, based on the output voltage, estimating an individual state of charge of the battery module by applying the state of charge shifting bias value to the state of charge of the vehicle battery pack, and controlling at least one of a charging current and a discharging current of the battery module according to the individual state of charge of the battery module.

In some examples, each of the multiple battery modules are connected with one another in parallel. In some examples, each of the multiple rechargeable battery cells includes a lithium battery cell. In some examples, the multiple rechargeable battery cells include at least one of a cylindrical cell, a pouch cell and a prismatic cell.

In some examples, the method includes measuring an output voltage of the vehicle battery pack, determining a feedback adjustment value according to the output voltage of the vehicle battery pack, and modifying the state of charge of the vehicle battery pack according to the feedback adjustment value.

In some examples, the method includes, for each of the multiple battery modules, identifying one or more of the multiple rechargeable battery cells having a lowest state of charge value, and delivering a measured voltage of the identified one or more of the multiple rechargeable battery cells to a corresponding module state of charge estimator.

In some examples, each of the multiple battery modules is configured to passively balance state of charge values of its corresponding multiple rechargeable battery cells by supplying current to a resistor from at least one of the multiple rechargeable battery cells having a highest state of charge value.

In some examples, the method includes, for each of the multiple battery modules identifying one or more of the multiple rechargeable battery cells having a state of charge greater than the lowest state of charge value of the battery module, and supplying current to a resistor from each of the identified one or more of the multiple rechargeable battery cells having a state of charge greater than the lowest state of charge value of the battery module.

In some examples, the method includes supplying an equal amount of output current from each of the multiple battery modules, in response to each of the multiple battery modules having a same individual state of charge. In some examples, each of the multiple battery modules is configured to supply output current via a unidirectional direct current converter.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
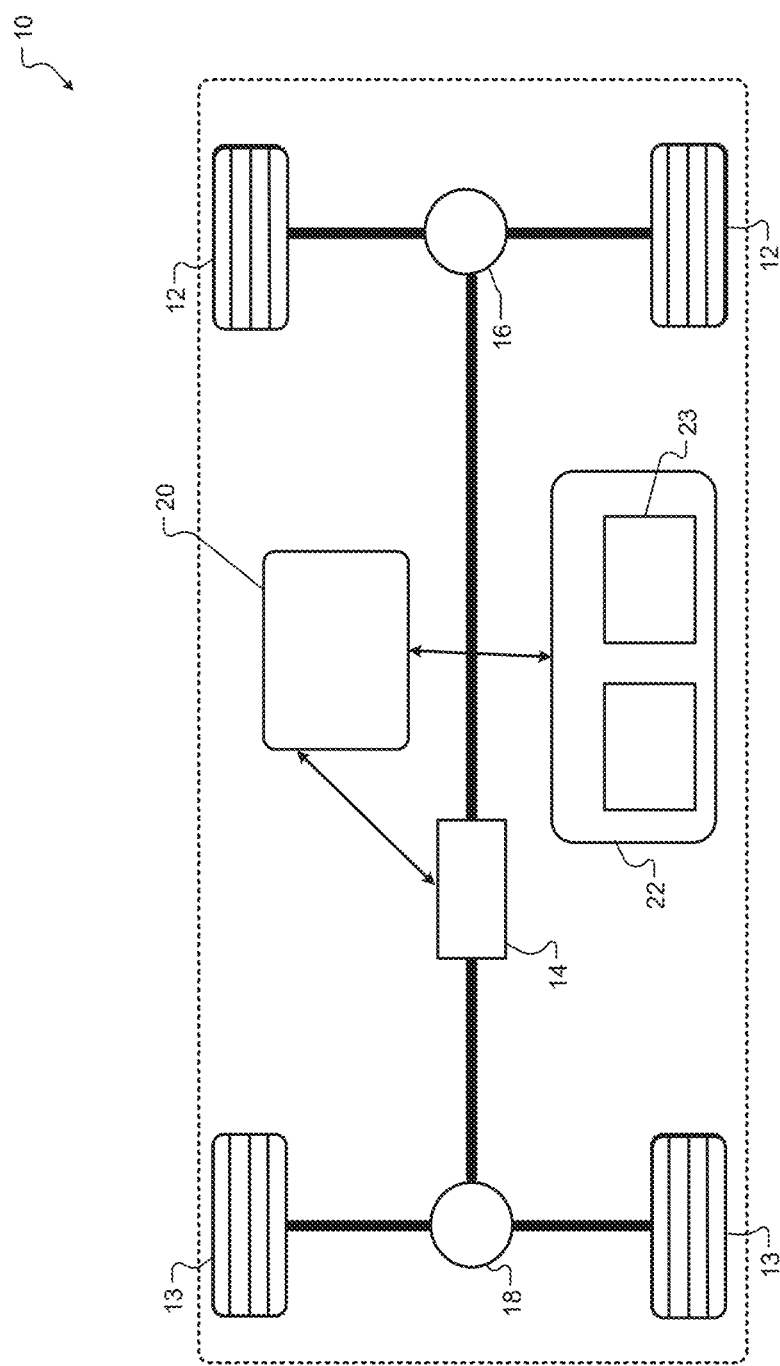
FIG. 1 is a diagram of an example vehicle including a vehicle battery module.

In some example embodiments, a state of charge (SOC) estimation method is provided for individual vehicle battery modules, without adding a significant computational load to control module(s) for the vehicle battery modules. For example, a vehicle control module may re-utilize a majority of components of a pack-level SOC estimator for a vehicle battery pack including multiple vehicle battery modules (which may each include one or more battery cells), to reduce or minimize additional computational load. Example methods described herein may also increase robustness of SOC estimation for individual battery modules, based on estimated relative SOC differences between individual battery modules.

In various implementations, a battery model within a vehicle battery pack-level SOC estimator may be used to estimate SOC values for individual battery modules (e.g., module-level SOC estimations) within the vehicle battery pack. This may significantly reduce a computational load of, for example, a vehicle control module configured to monitor battery SOC values.

Example methods may increase robustness of SOC estimations, because the module-level SOC estimations share a common battery model which may be continuously corrected in real-time based on voltage and/or current measurements. For example, the model within the pack-level SOC estimator may be corrected in real-time (or near real-time) based on pack-level measurements, such as a terminal voltage or voltage output of the vehicle battery pack (which includes multiple vehicle battery modules).

In various implementations, a searching method is used to find, for each individual battery module, a shifting bias value from a pack-level SOC estimation which achieves a predicted output (e.g., terminal voltage) of the individual battery module that is equal or substantially equal to a measurement of a voltage output of the individual battery module. For example, an algorithm may use the pack-level SOC estimation, and then determine how much shifting bias away from the pack-level SOC estimation value is needed to correctly predict a measured terminal voltage of an individual battery module (e.g., what difference between the pack-level SOC estimation and an individual battery module SOC estimation would result in a predicted battery module terminal voltage which matches an actual measured battery module terminal voltage).

The pack-level SOC estimation and the determined shifting bias may be supplied to a low-pass filter to obtain a final module-level SOC estimation value for the individual battery module. The SOC shifting bias determination method may be repeated separately for each individual battery module, to estimate an individual module-level SOC for each battery module.

In some examples, the estimated SOC for each individual battery module may be used for active balancing of the multiple battery modules. For example, distributed converters or other suitable systems may use the module-level SOC estimations to actively balance SOC values for the multiple battery modules (e.g., by drawing more current from individual battery modules having higher estimated SOC values).

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

For example, the battery pack 22 may include multiple rechargeable vehicle battery modules 23 configured to supply power to the drive unit 14. Each battery module 23 may include one or more rechargeable battery cells (e.g., lithium battery cells), which may be connected with one another in series or in parallel. The battery pack 22 may provide one or more voltage outputs for powering different components of the vehicle, such as a low voltage (LV) output (e.g., 3.3 volts, 5 volts, 12, volts, etc.), a high voltage (HV) output (e.g., 48 volts, 96 volts, 200 volts, 300 volts, 400 volts, etc.), or other suitable voltage values (e.g., 24 volts, etc.).

The vehicle control module 20 may be configured to monitor parameters of the battery pack 22 via one or more sensors, such as pack-level voltage and current values, voltage and current of battery modules 23 within the battery pack 22, SOC estimated values for the battery pack 22 and battery modules 23 within the battery pack 22, temperatures of the battery pack 22 and battery modules 23, etc. The vehicle control module 20 may be configured to control charging and discharging of the battery pack 22, current balancing of battery modules 23 in the battery pack 22, voltage balancing of battery modules 23, SOC balancing of the battery modules 23, etc.

In some example embodiments, electrical connectors between battery modules 23 and/or battery cells within the battery pack 22 may be coated with, e.g., a dielectric coating which is configured to remain electrically insulative even under a thermal runaway condition of one or more rechargeable battery cells. Example coating materials may include, but are not limited to, pre-ceramic polymers (e.g., polysilazane, polycarboslilane), ceramics including boron nitride nanotubes, titanium nitride, chromium carbide, magnesium zirconate, zirconia, titanium, tungsten, combinations thereof, etc.

The rechargeable battery cells may include any suitable cells configured to store power and supply the power to a drive unit such as an electric motor, including cylindrical cells, pouch cells, prismatic cells, etc. The rechargeable battery cells may be arranged in any suitable orientations, with the battery terminals facing any face (e.g., six faces) of a vehicle battery assembly enclosure. The rechargeable battery cells may be encapsulated in a polymer potting.

In some examples, the vehicle battery assembly enclosure may include a plastic material, a filler filled plastic material, etc. The plastic material may include, for example, nylon, polycarbonate, polypropylene, acrylonitrile butadiene styrene (ABS), etc. The filler may include a flame retardant, glass fiber, glass bubbles, etc. In some examples, the vehicle battery assembly enclosure may have a V-0 flammability rating (e.g., where burning stops within ten seconds after two applications of ten seconds each of a vertical flame to a test bar, where no flaming drips are allowed).

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration pedal, a brake pedal, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as cameras, microphones, pressure sensors, steering wheel position sensors, braking sensors, location sensors such as global positioning system (GPS) antennas, wheel height and/or position sensors, accelerometers, etc.). Some sensors may be configured to monitor current motion of the vehicle, acceleration of the vehicle, braking of the vehicle, current steering direction of the vehicle, current height and/or position of one or more wheels, etc.

The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

Figure 2:
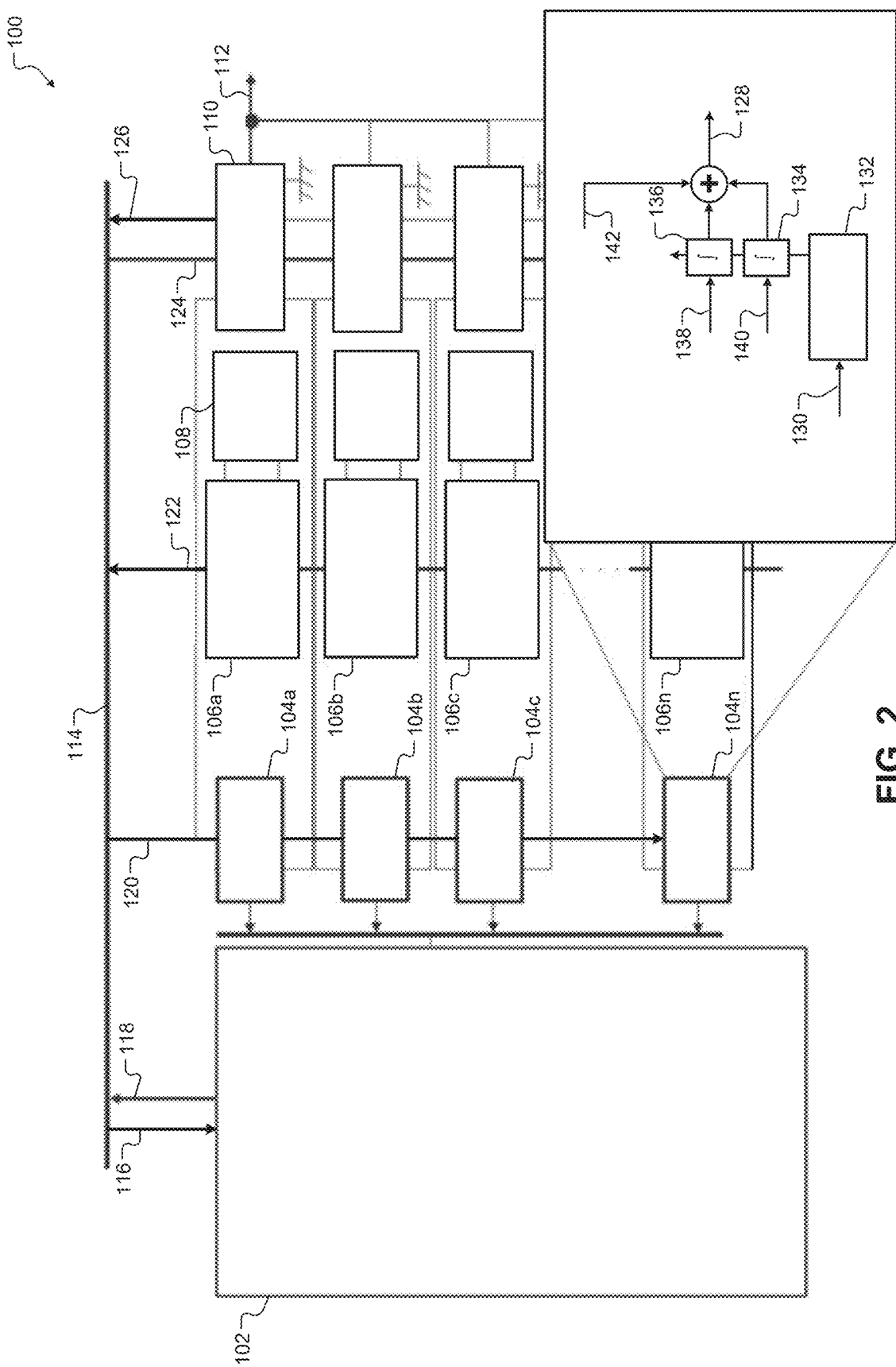
FIG. 2 is a block diagram of an example system for estimating state of charge of multiple vehicle battery modules.

FIG. 2 is a block diagram of a system 200 for estimating state of charge of multiple battery modules 106a, 106b, 106c . . . 106n. As shown in FIG. 2, an SOC balancing control 102 is connected to receive estimated SOC values for each of the multiple battery modules 106a, 106b, 106c . . . 106n.

For example, an SOC estimator 104a may be configured to estimate a SOC value for the battery module 106a, and supply the estimated SOC value to the SOC balancing control 102. An SOC estimator 104b may be configured to estimate a SOC value for the battery module 106b, an SOC estimator 104c may be configured to estimate a SOC value for the battery module 106c, and an SOC estimator 104n may be configured to estimate a SOC value for the battery module 106n.

The SOC balancing control 102 may be configured to transmit a desired converter set-point 118 for each converter to a communication bus 114. For example, the communication bus 114 may be coupled with a vehicle control module (such as the vehicle control module 20 of FIG. 1), the SOC balancing control 102 and the communication bus 114 may be part of a vehicle control module, etc. The SOC balancing control 102 may receive a converter temperature 116 from each converter, via the communication bus 114.

Each SOC estimator 104a, 104b, 104c . . . 104n may receive one or more converter parameters 120 from the communication bus 114, such as a converter input current from each converter, a high voltage (HV) current measurement, a temperature measurement, etc. Each SOC estimator 104a, 104b, 104c . . . 104n may be coupled with a high voltage sensor, to sense a voltage (e.g., an output terminal voltage) of its corresponding one of the multiple battery modules 106a, 106b, 106c . . . 106n.

Each of the multiple battery modules 106a, 106b, 106c . . . 106n may be configured to supply battery module parameters 122 to the communication bus 114, such as a sensed high voltage output current of the battery module, a sensed temperature of the battery module (e.g., via a temperature sensor associated with the battery module), etc.

Each of the multiple battery modules 106a, 106b, 106c . . . 106n may be coupled with a cell balancing control 108, to balance (e.g., passively balance) SOC values of battery cells within the battery module, current or voltage values of battery cells within the battery module, etc. Each of the multiple battery modules 106a, 106b, 106c . . . 106n may be configured to supply power via a corresponding unidirectional direct current (DC) converter 110, a bidirectional direct current converter, or any other suitable converter. For example, the unidirectional DC converters 110 may be coupled in parallel to supply a low voltage current 112. Each unidirectional DC converter 110 may receive a desired set-point 124 from the communication bus 114, and may supply converter parameters 126 to the communication bus 114 (such as measured converter input current, converter temperature, etc.).

Each SOC estimator may be configured to estimate an SOC value 128 for its corresponding battery module. For example, the SOC estimator may receive a sensed high voltage current 138 and integrate the current with a first integrator 136, and receive a sensed current 140 of the battery module and integrate the current with a second integrator 134. The integration process may be adjusted according to a feedback adjustment 132, based on a sensed voltage 130 of the battery module. The integrated currents may be summed with an initial state of charge 142 of the battery module, to determine the SOC value 128.

In some example embodiments, the overall system structure may include multiple battery modules, each having multiple cells and a DC/DC converter. The system may be a low voltage redundant system, where if one module fails, the remaining modules still work properly. If one battery module has a higher state of charge, the system may allow that battery module to provide more output current compared to other battery modules.

Figure 3:
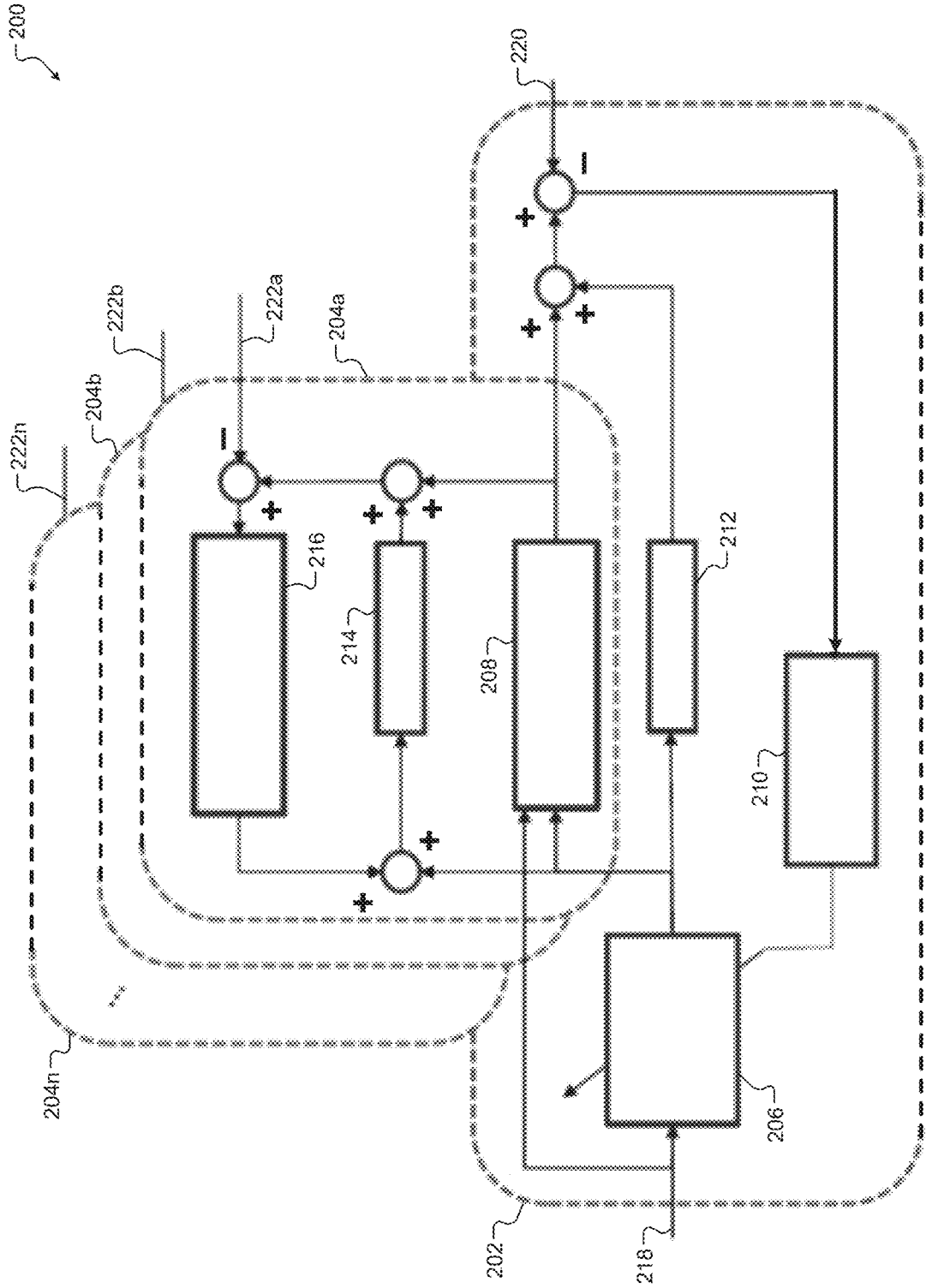
FIG. 3 is a block diagram of an example system for estimating state of charge of multiple vehicle battery modules using a shifting bias adjustment for each battery module.

FIG. 3 is a block diagram of an example system 300 for estimating state of charge of multiple battery modules 204*a*, 204*b* . . . 204*n*, using a shifting bias adjustment for each battery module. As shown in FIG. 3, a pack-level SOC estimation module 202 includes a coulomb counter configured to receive a pack-level current 218, and estimate a pack-level SOC (such as by integrating the sensed pack-level current over time, etc.).

The pack-level SOC estimation module 202 receives a pack-level voltage measurement, and a feedback adjustment 210 is configured to modify operation of the coulomb counter according to the pack-level voltage measurement 220. The feedback adjustment 210 may also receive an open circuit voltage 212.

Each of the battery modules 204*a*, 204*b* . . . 204*n* uses a transient voltage module 208 which receives the pack-level current 218 and the pack-level SOC as estimated by the coulomb counter 206.

The battery module 204*a* is configured to receive a voltage measurement 222*a* of the battery module 204*a*, and determine a state of charge adjustment 216 (e.g., shifting bias) based on the transient voltage module 208, the voltage measurement 222*a* and an open circuit voltage 214. The state of charge adjustment 216 is used to determine an estimated individual SOC for the battery module 204*a*.

The battery module 204*b* is configured to receive a voltage measurement 222*b* of the battery module 204*b*, and determine a SOC adjustment for estimating an individual SOC of the battery module 204*b*. The battery module 204*n* is configured to receive a voltage measurement 222*n* of the battery module 204*n*, and determine a SOC adjustment for estimating an individual SOC of the battery module 204*n*.

Compared to the system 100 of FIG. 1, the system 200 of FIG. 2 may reduce a computational load (e.g., of the vehicle control module or other battery control module), without compromising reliability. The system 200 may estimate SOC values for the battery pack and/or individual battery modules using, for example, a single particle model corrected by a Kalman filter in real-time based on pack-level voltage and current. The system 200 may use diffusion dynamics, lithium surface density, intercalating current, a nonlinear function, an OCV curve, etc., to adjust a state delta x such that a predicted voltage error for an individual battery module using a model is zero. For example, normalized lithium densities inside a single particle may be shifted such that a predicted voltage error for an individual battery module using a model is zero if a SOC value changes.

Figure 4:
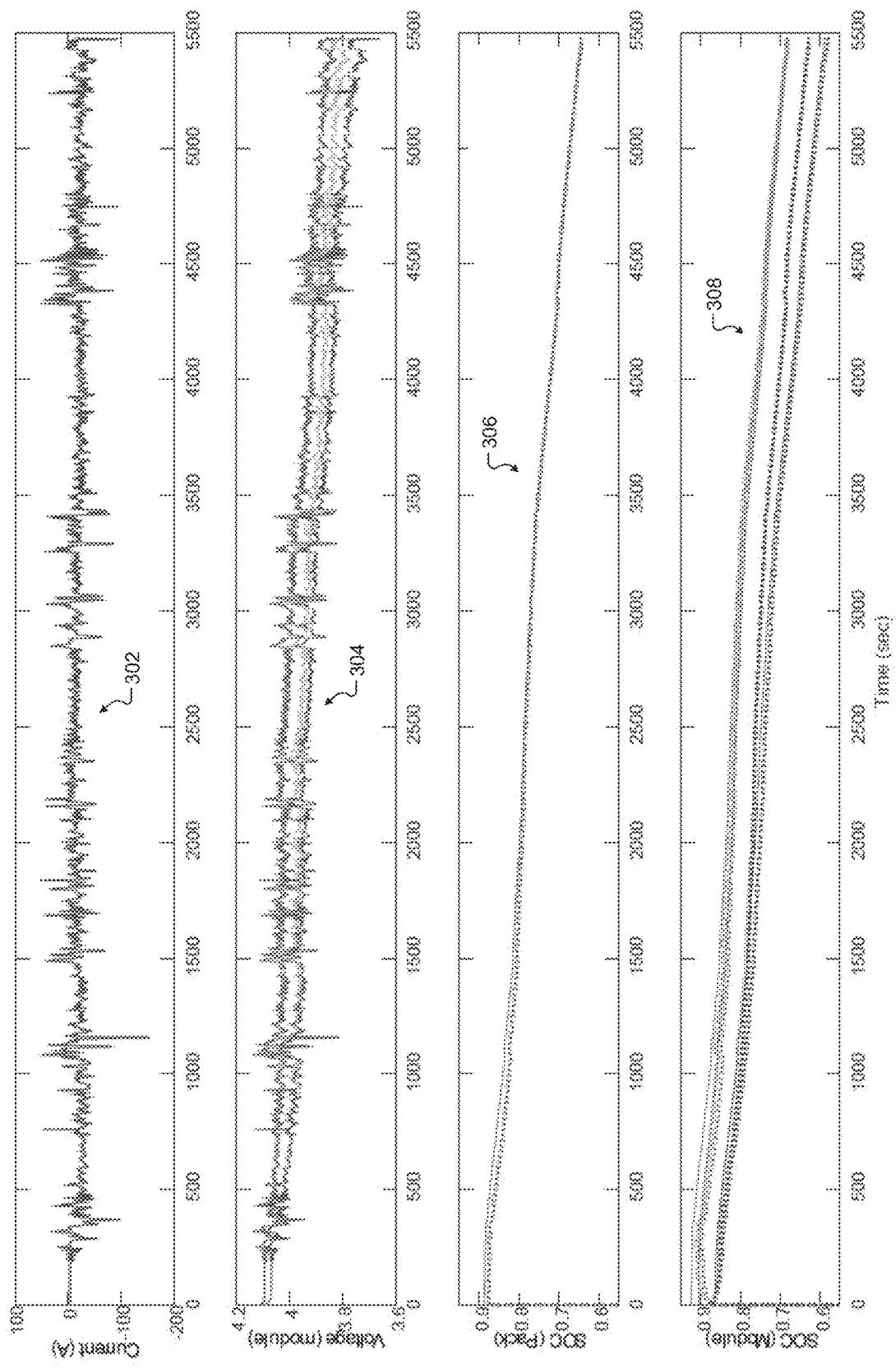
FIG. 4A is an example line graph of a current of the vehicle battery pack over time.
FIG. 4B is an example line graph of a voltage of multiple vehicle battery modules over time.
FIG. 4C is an example line graph of an estimated state of charge of a vehicle battery pack over time.
FIG. 4D is an example line graph of an estimated state of charge of multiple vehicle battery modules over time.

FIG. 4A is an example line graph of a current 302 of the vehicle battery pack over time, and FIG. 4B is an example line graph of voltages 304 of multiple vehicle battery modules over time. As shown in FIG. 4B, the different vehicle battery modules may have different voltages at the same point in time, and their voltages may reduce over time in different ways while driving.

FIG. 4C is an example line graph of an estimated state of charge 306 of a vehicle battery pack over time. FIG. 4D is an example line graph of an estimated states of charge 308 of multiple vehicle battery modules over time. As shown in FIG. 4D, different vehicle battery modules may have different states of charge at the same point in time, and their estimated SOC values may reduce over time in different ways following actual SOC.

Figure 5:
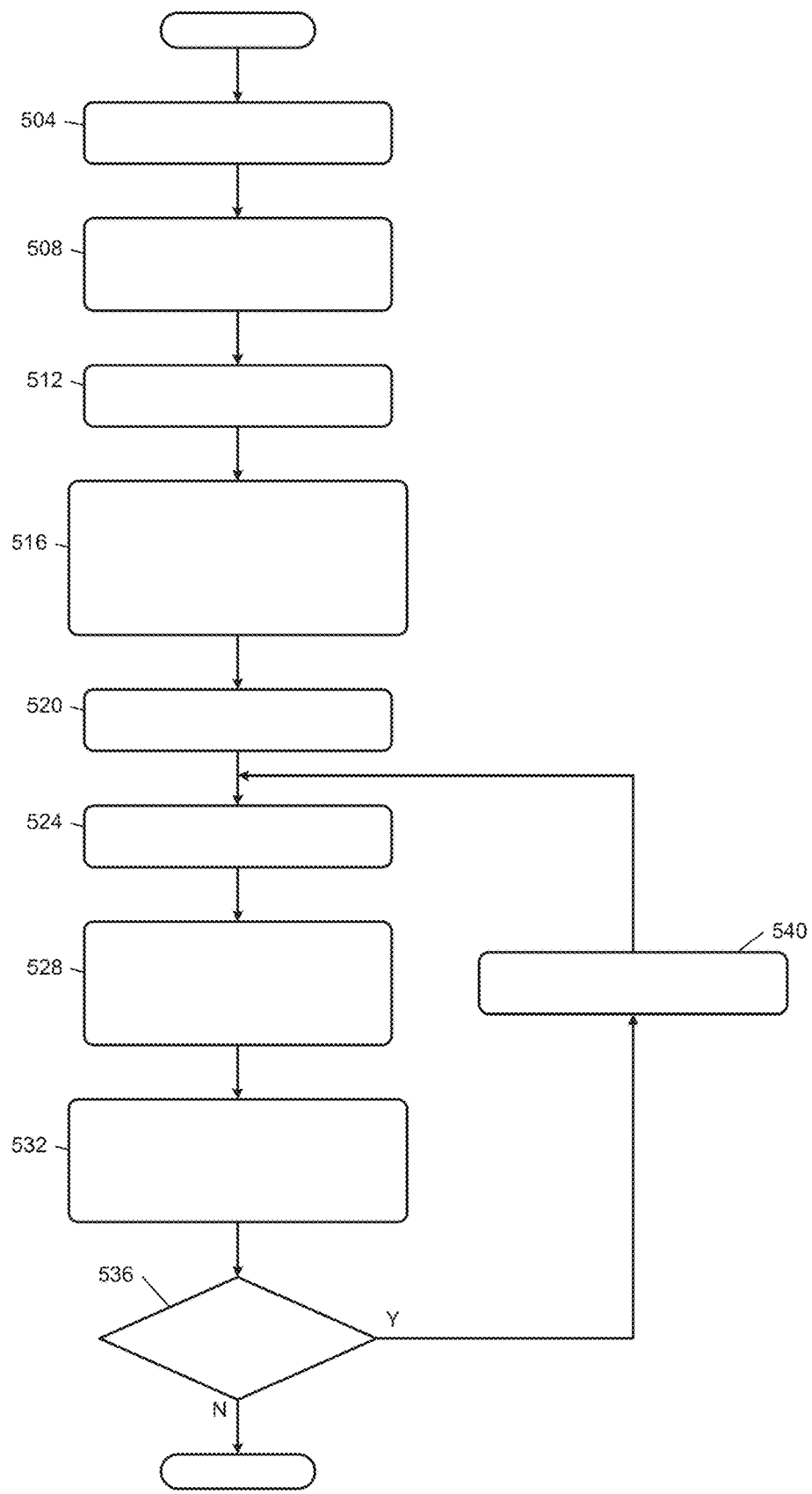
FIG. 5 is a flowchart depicting an example process for estimating an individual state of charge for multiple vehicle battery modules.

FIG. 5 is a flowchart depicting an example process for estimating an individual state of charge for multiple vehicle battery modules. The process of FIG. 5 may be performed by, for example, the vehicle control module 20 of FIG. 1. At 504, the process begins by measuring a pack-level voltage of the vehicle battery pack (e.g., using one or more voltage sensors at input and/or output terminal(s) of the vehicle battery pack, etc.).

At 508, the process includes determining a feedback adjustment value based on the measured pack-level voltage. For example, a current voltage level of the vehicle battery pack may affect a SOC estimation based on, e.g., a coulomb counter measuring a current supplied to or released by the vehicle battery pack. The vehicle control module is configured to obtain a pack-level current of the vehicle battery pack at 512, such as by using one or more current sensors at input and/or output terminal(s) of the vehicle battery pack, etc.).

The process continues at 516 by determining a pack-level state of charge (SOC) based on the measured pack-level current, using a coulomb counter. For example, the coulomb counter may integrate a current to and/or from the battery pack over time, to determine a level of the SOC of the battery pack. The feedback adjustment from 508 may be applied to the coulomb counter monitoring, or the estimated battery pack SOC model, to improve accuracy of the estimated SOC of the battery pack based on the battery pack voltage.

At 520, the vehicle control module is configured to select a first one of multiple vehicle battery modules within the vehicle battery pack. Control then measures a voltage of the selected vehicle battery module at 524, such as via an output terminal of the selected vehicle battery module.

At 528, control determines an SOC adjustment value (e.g., a shifting bias) for the selected battery module, based on the measured battery module voltage. Control then applies the SOC adjustment to the pack-level SOC to determine a module-level SOC for the selected battery module, at 532.

Control determines whether any battery modules remain at 536. If so, control proceeds to 540 to select a next one of the multiple battery modules, and returns to 524 to measure a voltage of the selected next battery module. Once all battery modules have been processed at 536, the process ends. In some examples, the process may return to 504 to measure an updated pack-level voltage, and repeat estimation of individual battery module SOC values. The process may be repeated periodically, such as every 100 milliseconds, every second, every minute, every hour, etc.

The vehicle control module may be configured to use the individual SOC estimation values for each battery module to control one or more aspects of the battery pack, such as selectively charging or discharging individual battery modules, selectively supplying current from individual battery modules to perform active SOC balancing of the battery modules, etc.

Figure 6:
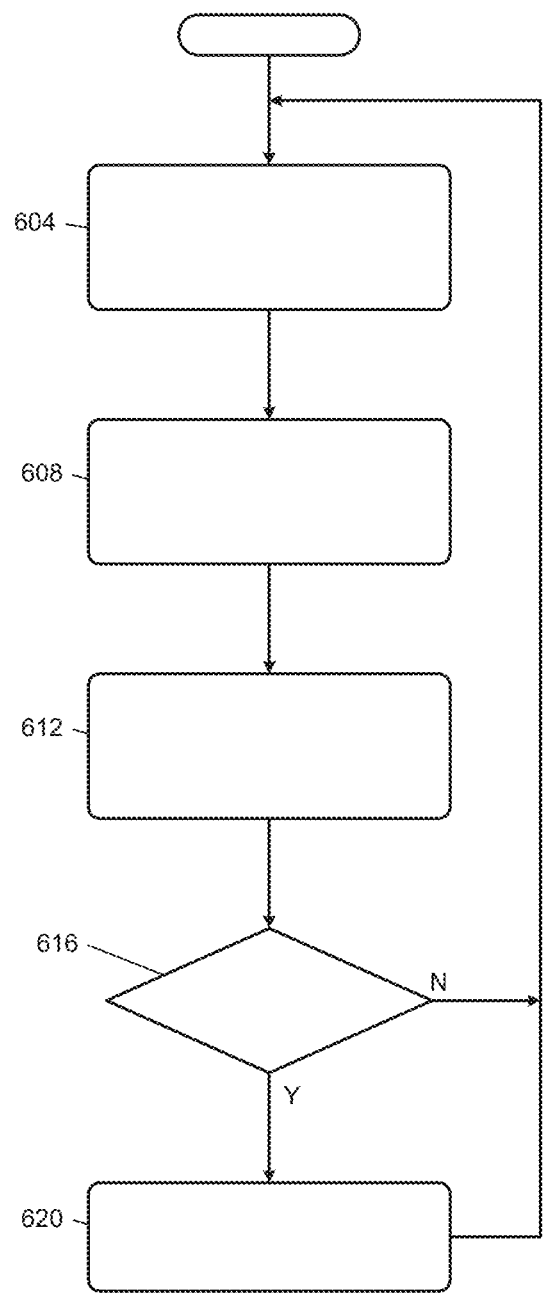
FIG. 6 is a flowchart depicting an example process for balancing state of charge values over multiple battery cells.

FIG. 6 is a flowchart depicting an example process for balancing state of charge values over multiple vehicle battery cells. The process of FIG. 6 may be performed by, for example, the vehicle control module 20 of FIG. 1. At 604, the process begins by, for each battery module, determining the voltage measurement of the battery cell(s) having the lowest SOC value in the battery module. For example, the voltage measurements 222a, 222b, . . . 222n, may be obtained for SOC estimation for each of the respective battery modules 204a, 204b, . . . 204n in FIG. 2. Control identifies battery cells having the lowest state of charge (SOC) value from among the multiple battery cells in a battery module.

At 608, the process includes determining a module-level SOC for each individual battery module (e.g., such as by using the example process of FIG. 5). For example, control may send the lowest SOC of each battery module to a corresponding battery module SOC estimator.

At 612, control identifies, for each battery module, whether any cells have a SOC which is higher than the lowest SOC of the module. If the number of identified cells having an SOC which is higher than the lowest SOC of the module, is greater than zero at 616, control proceeds to supply current to a resistor from the identified cells at 620 (e.g., to lower the SOC of the identified cells down towards the lowest SOC of the module).

While current is being supplied to the resistor at 620 (or after supplying current), control determines at 616 whether the SOC value for the current supplying battery cell has dropped to be equal to the lowest SOC value of the module. If the SOC value for the current supplying battery cell has dropped to be equal to the lowest SOC value of the module, the process stops supplying current to the resistor from the battery cells. If not, control continues supplying current to the resistor from the battery cells having the higher SOC value.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle battery control system comprising:
    at least one electric motor configured to drive one or more wheels of a vehicle;
    a vehicle battery pack configured to supply power to the at least one electric motor, the vehicle battery pack including multiple battery modules, each of the multiple battery modules including multiple rechargeable battery cells; and
    a vehicle control module configured to:
        measure an output current of the vehicle battery pack;
        estimate a state of charge of the vehicle battery pack based on the output current, using a coulomb counter; and
        for each of the multiple battery modules,
            measure an output voltage of the battery module,
            determine a state of charge shifting bias value for the battery module, based on the output voltage,
            estimate an individual state of charge of the battery module by applying the state of charge shifting bias value to the state of charge of the vehicle battery pack, and
            control at least one of a charging current and a discharging current of the battery module according to the individual state of charge of the battery module.

2. The vehicle battery control system of claim 1, wherein each of the multiple battery modules are connected with one another in parallel.

3. The vehicle battery control system of claim 1, wherein each of the multiple rechargeable battery cells includes a lithium battery cell.

4. The vehicle battery control system of claim 1, wherein the multiple rechargeable battery cells include at least one of a cylindrical cell, a pouch cell and a prismatic cell.

5. The vehicle battery control system of claim 1, wherein the vehicle control module is configured to:
    measure an output voltage of the vehicle battery pack;
    determine a feedback adjustment value according to the output voltage of the vehicle battery pack; and
    modify the state of charge of the vehicle battery pack according to the feedback adjustment value.

6. The vehicle battery control system of claim 1, wherein the vehicle control module is configured to, for each of the multiple battery modules:
    determine a lowest state of charge value for the multiple rechargeable battery cells of the battery module; and
    send the lowest state of charge value of each battery module to a corresponding battery module state of charge estimator.

7. The vehicle battery control system of claim 6, wherein each of the multiple battery modules is configured to passively balance state of charge values of its corresponding multiple rechargeable battery cells by supplying current to a resistor from at least one of the multiple rechargeable battery cells having a highest state of charge value.

8. The vehicle battery control system of claim 6, wherein the vehicle control module is configured to, for each of the multiple battery modules:
    identify one or more of the multiple rechargeable battery cells having a state of charge greater than the lowest state of charge value of the battery module; and
    supply current to a resistor from each of the identified one or more of the multiple rechargeable battery cells having a state of charge greater than the lowest state of charge value of the battery module.

9. The vehicle battery control system of claim 1, wherein the vehicle control module is configured to supply an equal amount of output current from each of the multiple battery modules, in response to each of the multiple battery modules having a same individual state of charge.

10. The vehicle battery control system of claim 1, wherein each of the multiple battery modules is configured to supply output current via a unidirectional direct current converter.

11. A method for controlling battery modules of a vehicle battery pack, the method comprising:
    measuring an output current of the vehicle battery pack, the vehicle battery pack configured to supply power to at least one electric motor of a vehicle, the vehicle battery pack including multiple battery modules, each of the multiple battery modules including multiple rechargeable battery cells;

estimating a state of charge of the vehicle battery pack based on the output current, using a coulomb counter; and for each of the multiple battery modules,
measuring an output voltage of the battery module,
determining a state of charge shifting bias value for the battery module, based on the output voltage,
estimating an individual state of charge of the battery module by applying the state of charge shifting bias value to the state of charge of the vehicle battery pack, and
controlling at least one of a charging current and a discharging current of the battery module according to the individual state of charge of the battery module.

12. The method of claim 11, wherein each of the multiple battery modules are connected with one another in parallel.

13. The method of claim 11, wherein each of the multiple rechargeable battery cells includes a lithium battery cell.

14. The method of claim 11, wherein the multiple rechargeable battery cells include at least one of a cylindrical cell, a pouch cell and a prismatic cell.

15. The method of claim 11, further comprising:
measuring an output voltage of the vehicle battery pack;
determining a feedback adjustment value according to the output voltage of the vehicle battery pack; and
modifying the state of charge of the vehicle battery pack according to the feedback adjustment value.

16. The method of claim 11, further comprising, for each of the multiple battery modules:
identifying one or more of the multiple rechargeable battery cells having a lowest state of charge value; and
delivering a measured voltage of the identified one or more of the multiple rechargeable battery cells to a corresponding module state of charge estimator.

17. The method of claim 16, wherein each of the multiple battery modules is configured to passively balance state of charge values of its corresponding multiple rechargeable battery cells by supplying current to a resistor from at least one of the multiple rechargeable battery cells having a highest state of charge value.

18. The method of claim 16, further comprising, for each of the multiple battery modules:
identifying one or more of the multiple rechargeable battery cells having a state of charge greater than the lowest state of charge value of the battery module; and
supplying current to a resistor from each of the identified one or more of the multiple rechargeable battery cells having a state of charge greater than the lowest state of charge value of the battery module.

19. The method of claim 11, further comprising supplying an equal amount of output current from each of the multiple battery modules, in response to each of the multiple battery modules having a same individual state of charge.

20. The method of claim 11, wherein each of the multiple battery modules is configured to supply output current via a unidirectional direct current converter.

* * * * *